United States Patent [19]

Leining

[11] Patent Number: 4,682,387
[45] Date of Patent: Jul. 28, 1987

[54] APPARATUS AND METHOD FOR STRIPPING CASING FROM SAUSAGES

[75] Inventor: Lyndon R. Leining, Austin, Minn.

[73] Assignee: Geo. A. Hormel & Co., Austin, Minn.

[21] Appl. No.: 918,324

[22] Filed: Oct. 14, 1986

[51] Int. Cl.⁴ .................. A22C 11/00; A22C 13/00
[52] U.S. Cl. ................................... 17/49; 17/1 F
[58] Field of Search .................... 17/49, 1 F, 1 R

[56] References Cited

U.S. PATENT DOCUMENTS

| | | | |
|---|---|---|---|
| 2,424,346 | 7/1947 | Wilcoxon | 17/49 X |
| 2,434,316 | 1/1948 | Golden et al. | 17/49 X |
| 4,118,828 | 10/1978 | Melanson | 17/49 X |
| 4,222,150 | 9/1980 | Andersen | 17/1 F |

Primary Examiner—Willie G. Abercrombie
Attorney, Agent, or Firm—Herman H. Bains

[57] ABSTRACT

An apparatus and method for stripping the casing from casing enclosed sausage sticks includes an indexing device which moves sausages in an arcuate path during which the front end of the sausage stick is severed. The sausage sticks are then moved horizontally, front end first, by a positioning conveyor, and the front edges of the casing are engaged by a casing stripper device. The casing is pulled from the sausage stick as the latter is moved by a positioning conveyor. The decased front end of the sausage stick is gripped by a movable gripper device which pulls the sausage from the casing. An ejector mechanism ejects the sausage from the gripper device.

14 Claims, 12 Drawing Figures

APPARATUS AND METHOD FOR STRIPPING CASING FROM SAUSAGES

This invention relates to an apparatus and method for stripping casing from sausage sticks.

BACKGROUND OF THE INVENTION

Sausages, such as pepperoni sausages, are formed in a stuffing operation in which the sausage emulsion is stuffed into a casing. The sausage stuffed casings are then clipped, smoked and further processed until the sausages are completely formed. After the sausages are formed, the casing is often removed to permit slicing of the sausage sticks for sale to consumers or institutions. Removal of the casing from the sausage sticks is typically accomplished in a manual operation which is both time-consuming and labor-intensive. Applicant is unaware of any apparatus or system for mechanically removing the casing from sausage sticks.

SUMMARY OF THE INVENTION

It is, therefore, a general object of this invention to provide a novel method and apparatus for mechanically removing casings from sausage sticks.

Another object of this invention is the provision of a novel apparatus for removing casing from sausage sticks, wherein the casing for each sausage stick is mechanically gripped by casing stripper means and the sausage is mechanically pulled from the casing to thereby strip the latter from the sausage stick.

A more specific object of this invention is to provide an apparatus for mechanically removing casings from sausage sticks wherein the encased sausage sticks are mechanically conveyed past casing stripper means, which is operable for engaging and retaining the casing as the sausage is mechanically gripped and pulled from the casing sausage gripper means. These and other objects of the invention will be more fully defined in the following Specification.

DESCRIPTION OF THE PREFERRED EMBODIMENT

Figure 1:
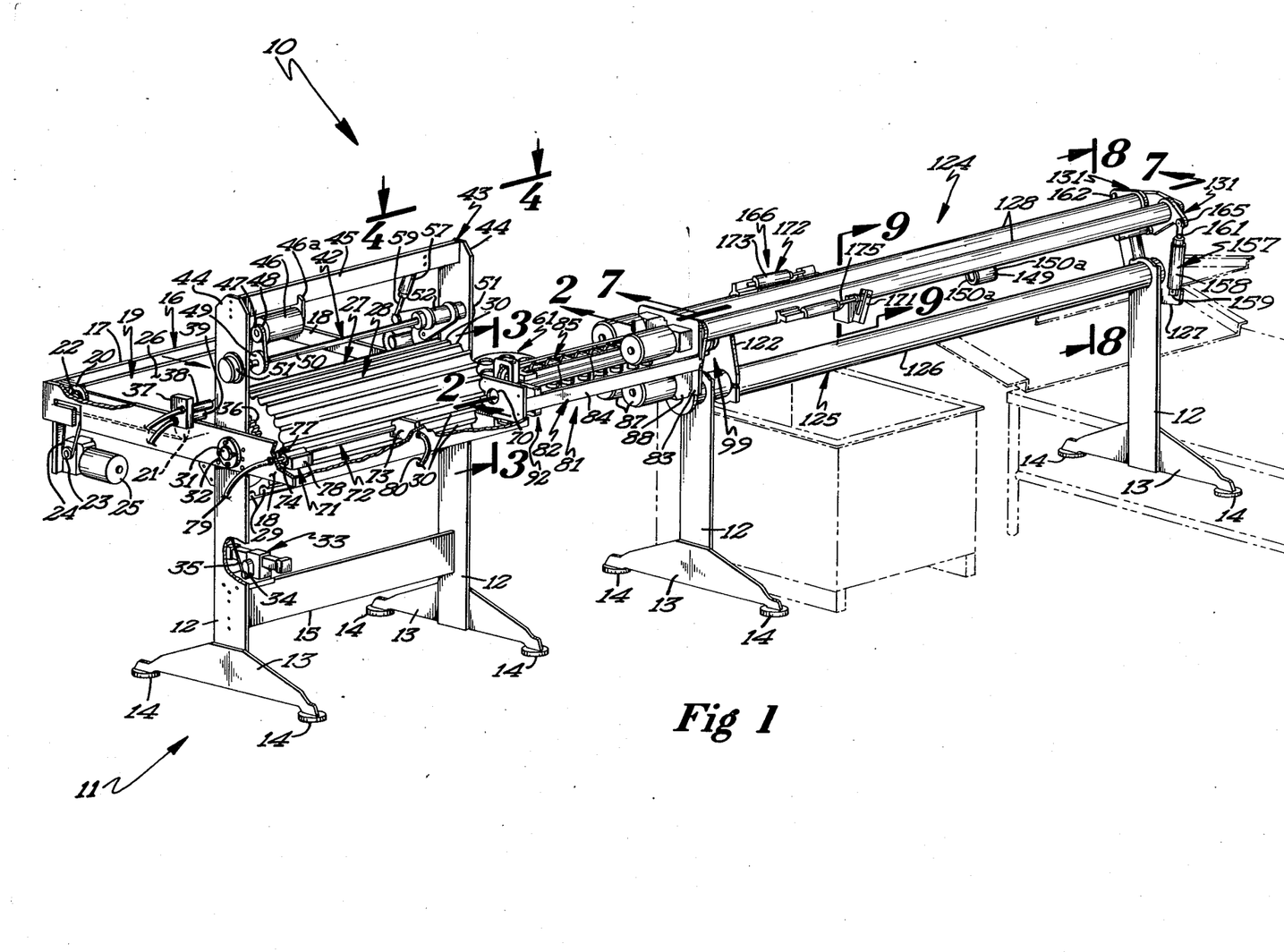
FIG. 1 is a perspective view of the casing stripper apparatus.
Figure 2:
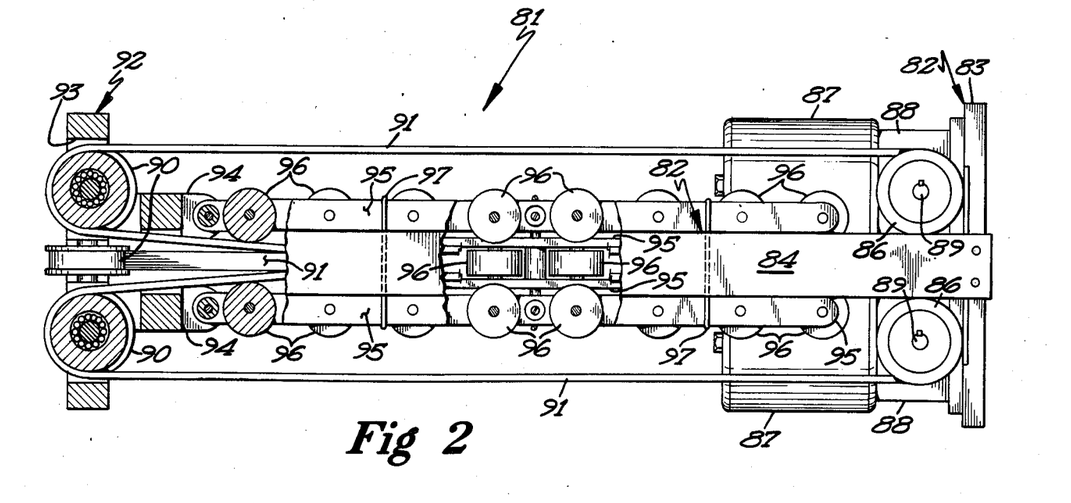
FIG. 2 is a fragmentary top view taken approximately along the line 2—2 of FIG. 1 and looking in the direction of the arrows.

Referring now to the drawings and, more specifically, to FIG. 1, it will be seen that one embodiment of the novel casing stripper apparatus, designated generally by the reference numeral 10, is thereshown. The novel casing stripper apparatus is operable to mechanically remove casings from sausage sticks. The casing stripper apparatus 10 includes a support frame 11 comprised of a plurality of longitudinally spaced apart vertical support members 12, each being rigidly affixed at its lower end to a base member 13. Each base member 13 is provided with a pair of transversely spaced apart foot elements 14 which engage the floor upon which the casing stripper apparatus 10 is placed. It will be noted that a pair of adjacent vertical support members or legs 12 are interconnected by a lower longitudinal frame member 15.

The casing stripper apparatus 10 includes an infeed and indexing means comprised of an infeed and indexing frame 19 of generally rectangular configuration. The frame 16 includes a pair of transversely spaced apart longituindally extending frame members 17 which are rigidly interconnected at their respective ends by a pair of transverse frame members 18. The transverse frame members are secured to a pair of vertical frame members 12 of the support frame 11. An infeed conveyor 19 is mounted on the frame 16 and includes a drive roller 20 extending between and journaled on the transverse frame members 18 adjacent one longitudinal frame member 16, as best seen in FIG. 1. The infeed conveyor also includes an idler roller 21 transversely spaced from the drive roller 20 and rotatably supported on the transverse frame members 18. A chain 24 is trained about the driven sprocket 22 on the drive roller and about the drive sprocket 23, the latter being connected to the output shaft of a drive motor assembly 25. An endless conveyor belt 26 is trained about the drive roller 20 and the idler roller 21. With this arrangement, it will be seen that, when the drive motor assembly 25 is energized, the upper run of the conveyor belt 26 will be moved in the direction indicated by the directional arrow. Sausage sticks which are to have their casings stripped therefrom will be placed upon the infeed conveyor 19 and will be conveyed thereby to an indexing device 27, which is mounted on the frame 16.

The indexing device 27 includes a revolvable, elongate longitudinal extending indexing drum 28 which is generally cylindrical in configuration, but which has a plurality of alternate arcuate recesses 29 and ribs 30 in the outer surface thereof. The arcuate recesses 29 are of a size and configuration to each accommodate an elongate sausage stick S therein. In this regard, the length of the drum 28 and the associated arcuate recesses 29 are approximately 4 inches longer than each sausage stick.

The indexing drum 28 has an axial opening therethrough for accommodating a shaft 31 that is journaled in bearings 32, each being mounted on one of the transverse frame members 18. Means are provided for driving the indexing drum 28 and this means includes an indexing drive mechanism 33, which is mounted on the vertical frame member 12. The indexing drive mechanism has an eccentric 34 affixed to its rotary output shaft and the eccentric is connected to one end of an elongate indexing arm 35. The other end of the indexing arm engages an indexing gear 36, which is splined to the shaft 31 for movement therewith. It will be seen that, when the indexing drive mechanism 33 is energized, it will rotate the gear 36 in indexed fashion to thereby rotate the indexing drum 28. With this arrangement, the sausage sticks S conveyed by the infeed conveyor 19 will each be received within one of the arcuate recesses and will be indexed by the indexing drum until the sausage sticks are discharged from the indexing device.

Referring again to FIG. 1, it will be seen that a generally rectangular shaped plate 37 is mounted on one of the transverse frame members 18 and projects upwardly therefrom. The plate 37 has a pneumatic cylinder and piston unit 38 mounted thereon and positioned so that the piston rod thereof will project into one of the arcuate recesses 29 when the piston rod is extended. The plate 37 also has a second pneumatic piston and cylinder unit 39 mounted thereon disposed in side-by-side relation with the pneumatic cylinder and piston unit 38. The cylinder and piston unit 39 is also positioned so that extension of the piston rod thereof will cause the latter to project into one of the arcuate recesses 29. These piston and cylinder units are used to push the sausage sticks longitudinally of the associated recess in the indexing drum.

A declipper unit 40 is also mounted on a bracket 40a and is disposed at the other end of the indexing drum 28 in opposed relation with respect to the pneumatic cylinder and piston unit 39. The declipper unit has a pair of declipper jaws 40b which are pneumatically actuated between the open and closed position by a pneumatic cylinder and piston unit 40c and which will engage the clipped end of the casing to cut a portion of the casing and clip from the sausage stick.

A gripper unit 41 is also positioned adjacent the declipper unit in side-by-side relation therewith. The gripper unit 41 is disposed in opposed relation to the pneumatic cylinder and piston unit 38. In this regard, the cylinder and piston unit 38, when extended, will shift the sausage stick S to be declipped towards the declipper unit where the clip will be cut from the end of the casing. If the jaws 40b close on the clip, instead of cutting the clip off, the jaws will clamp the clip while the housing cylinder retracts, tearing the clip from the casing. This extra action insures clip removal. When the sausage is shifted to the next position, the cylinder and piston unit 39 will engage the sausage and urge the declipped end thereof into the gripper unit where the end of the sausage stick S is cut therefrom by a cutting assembly 42.

The cutting assembly 42 is mounted on a cutting assembly support frame 43, which includes a pair of vertical frame members 44, each being rigidly secured at a lower end to one of the transverse frame members 18 and projecting upwardly therefrom. Vertical frame members 44 are rigidly interconnected at their upper end by a longitudinal frame plate 45.

The cutting assembly 42 includes an electric motor 46 mounted on the longitudinal frame plate 46a adjacent one end thereof. The output shaft of the rotary electric motor 46 has a pulley 47 mounted thereon and a belt is trained around the pulley 47 and around a pulley 49, the latter being mounted on an elongate drive shaft 50. The drive shaft 50 extends between and projects through openings in the vertical frame members 44 and has its ends journaled in suitable bearings 51. It will be noted that the bearings 51 are mounted on the exterior surfaces of the frame members 44. With this arrangement, it will be seen that, when motor 46 is energized, the shaft 50 will be rotated.

The shaft 50 projects through and is journaled in a cylindrical torque tube or bearing unit 52, which is positioned adjacent one end of the shaft 50. The shaft 50 also has a drive pulley 50a splined thereon and an endless belt 53 is trained about the drive pulley 50a and a driven pulley 54. The driven pulley 54 has its axle journaled in an elongate plate 55, which is mounted on the torque tube 52. The pulley 54 also has a rotary blade 56 secured thereto for rotation therewith.

Means are provided for shifting the rotary blade 56 between an operative and inoperative position. This means includes a double acting pneumatic cylinder 57 which is connected to the longitudinal frame plate 45 by a pivot 58. The piston rod 59 of the cylinder and piston unit is pivotally connected by a pivot 60 to a collar 52a affixed to the torque tube 52. It will therefore be seen that, when the piston rod 59 is extended and retracted, the rotary blade 56 will be shifted between operative and inoperative positions. When the piston rod is extended, the blade will be rotated in a direction so that the blade will cut the end portion of a sausage stick which is gripped by the gripper unit 41.

Figure 7:
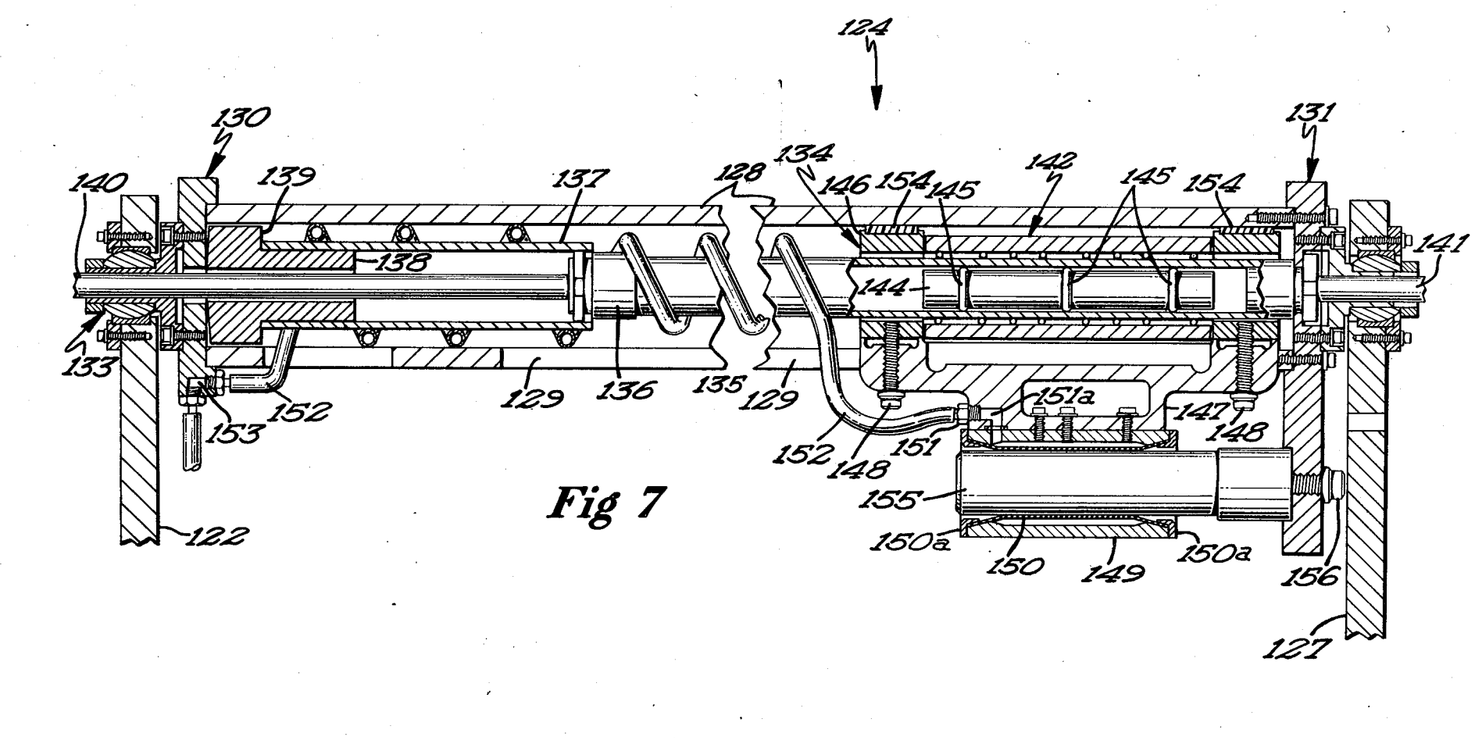
FIG. 7 is a full cross-sectional view taken approximately along the line 7—7 of FIG. 1, looking in the direction of the arrows, and showing the sausage gripping device.

Means are provided for discharging each sausage stick from the indexing drum 28 after the end portion of each sausage stick has been cut therefrom by the cutting assembly 42. In this regard, it will be noted that the transverse frame member 18 located adjacent the downstream end of an indexing drum has a discharge opening 70 therein. A sausage discharge mechanism 71 includes a Festo linear drive cylinder 72 which has one end thereof rigidly affixed to a stop member 73 and which has its other end rigidly affixed to one of the transverse frame members 18. A cylindrical sleeve 74 is slidably mounted on the linear drive cylinder 72 for movement between a retracted position adjacent the transverse frame member 18 and an advanced position in which the sleeve engages the stop member 73. The sleeve is moved by a magnetic slug or piston (not shown) which is movable in the drive cylinder 72. The magnetic slug or piston is provided with an O-ring which engages the interior surface of the linear drive cylinder 72 to form an air seal thereat. The magnetic slug is moved axially of the drive cylinder by air under pressure in either an advanced or retracted direction. A detailed illustration of the Festo cylinder unit is illustrated in FIG. 7 and described hereinbelow. The Festo cylinder unit 72 is similar in operation and construction to the one shown in FIG. 7.

The sleeve 74 is formed of magnetic material and will move in response to movement of the magnetic slug 75. In this regard, the Festo linear drive cylinder is formed of stainless steel and is passive or inert to magnetic forces. The sleeve 74 has an arcuate sausage engaging member 77 affixed thereto for movement therewith. The sausage engaging member projects into one of the arcuate recesses 29 and engages the end of a sausage stick S to move the stick through the opening 70 when the sausage discharge mechanism is moved from the retracted position to the advanced position. The sausage engaging member 77 has a counterweight 78 rigidly affixed thereto and affixed to the sleeve 74. A conduit 79 is connected to a fitting on the drive cylinder 72 and is also connected to a source of air under pressure. A second conduit 80 is connected by a fitting to the stop member, which has a passage therethrough (not shown), which communicates with the interior of the drive cylinder 72. The conduit 80 is also connected to a source of air under pressure and it will be seen that actuation of a suitable valve member (not shown) will produce linear movement of the sleeve and sausage engaging member to urge each sausage engaging member axially or longitudinally of the drum and through the opening 70.

Figure 3:
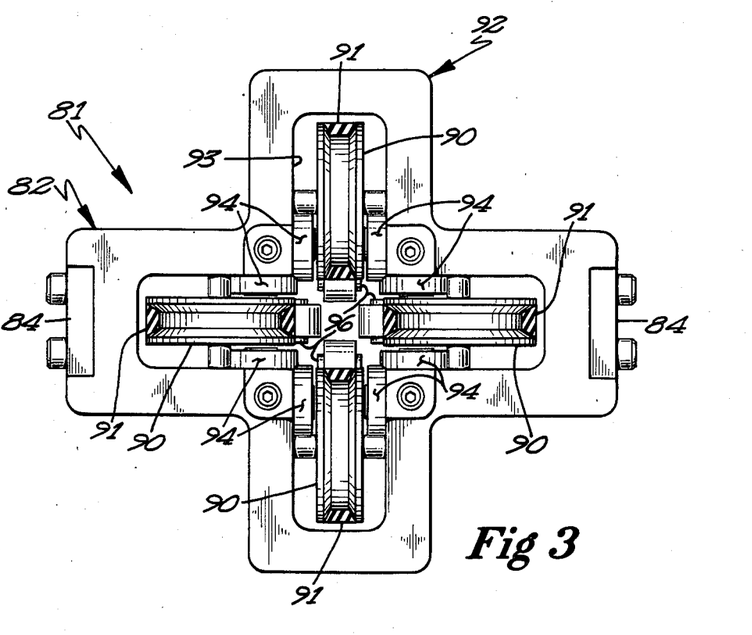
FIG. 3 is a cross-sectional view taken approximately along the line 3—3 of FIG. 1 and looking in the direction of the arrows.
Figure 4:
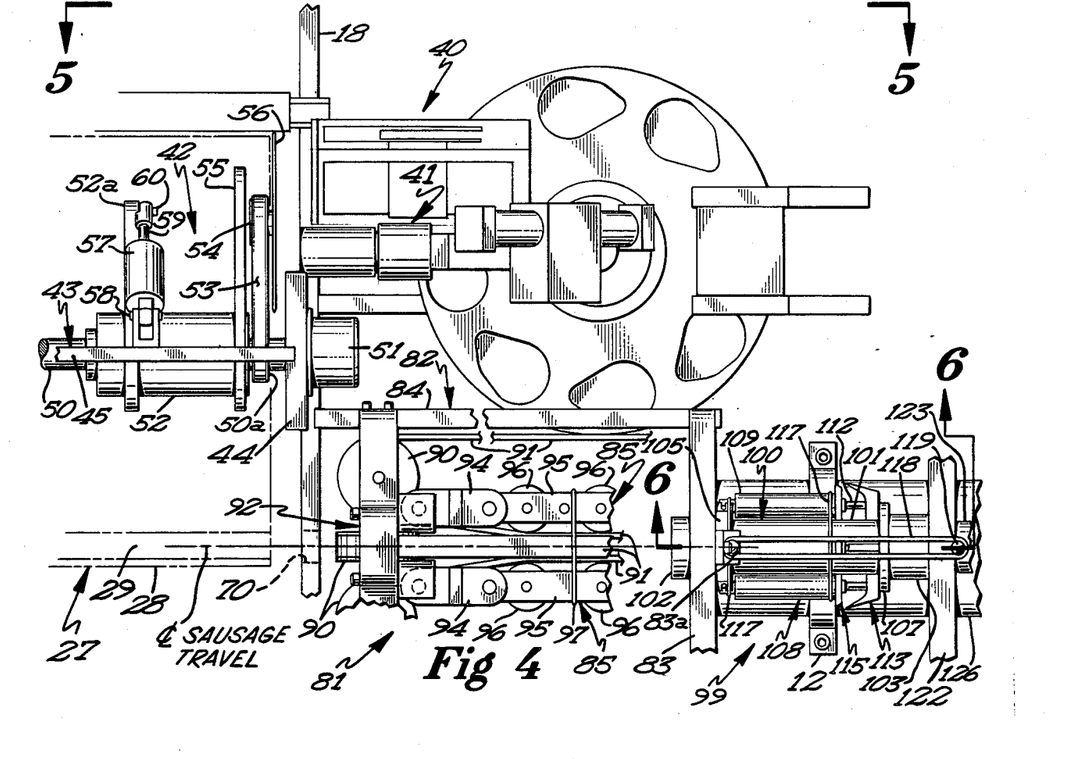
FIG. 4 is a top plan view of a portion of the apparatus taken approximately along the line 4—4 of FIG. 1 and looking in the direction of the arrows.
Figure 5:
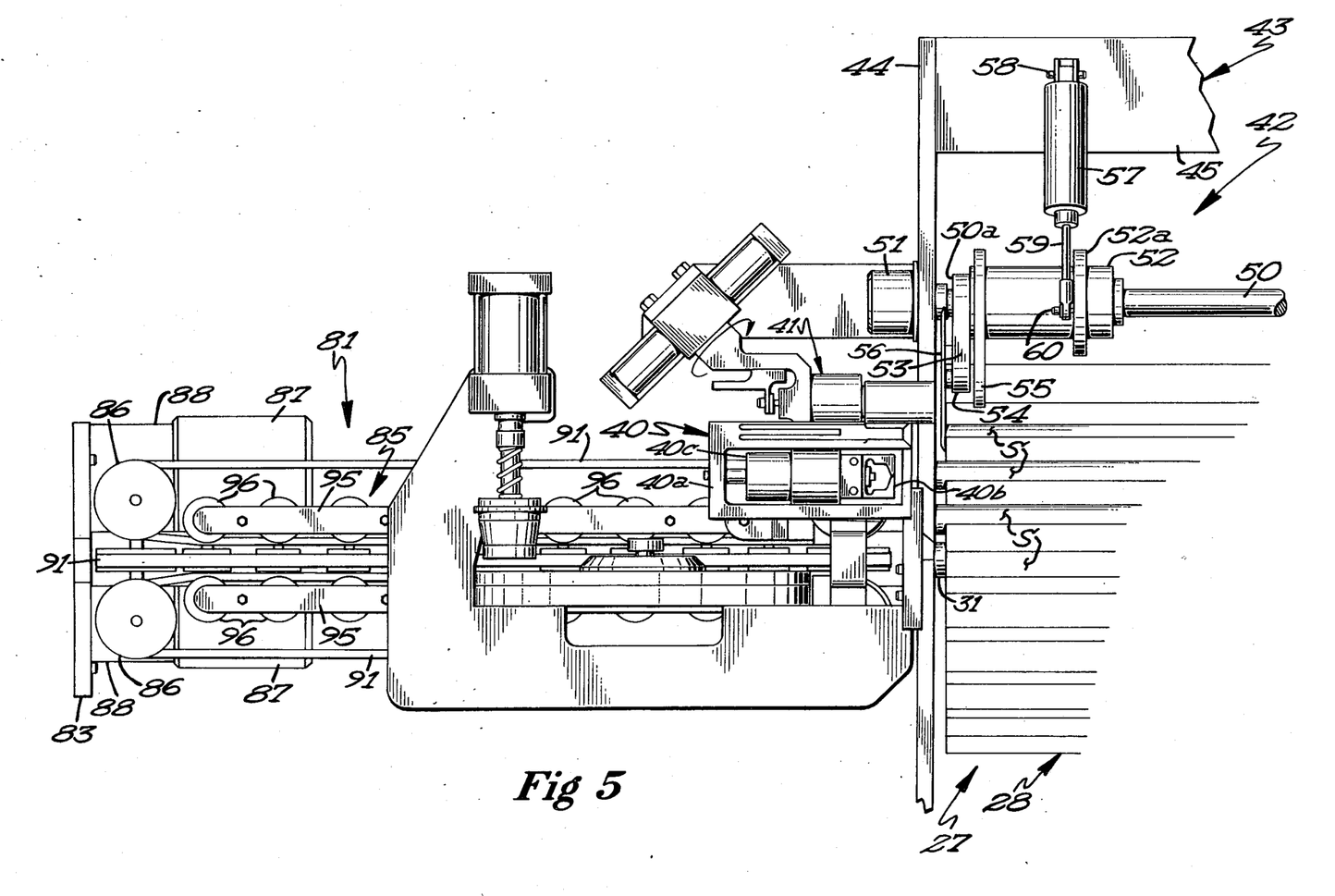
FIG. 5 is a side view of the product reclaiming area taken approximately along the line 5—5 of FIG. 4 and looking in the direction of the arrows.

When the product is discharged from the indexing device by the sausage discharge mechanism 71 through the opening 70 in the transverse frame member 28, the sausage is moved into engagement with an elongate positioning conveyor 81. The positioning conveyor 81 is disposed in aligned relation with that arcuate recess of the indexing drum which is disposed in coaxial relation with the opening 70. The positioning conveyor includes an elongate positioning conveyor frame 82 which includes a vertically disposed end plate 83 which is rigidly interconnected with one of the transverse frame members 18 by longitudinal frame members 84. The positioning conveyor 81 also includes four separate conveyor mechanisms 85 which are arranged in opposed pairs, as best seen in FIG. 3. Each conveyor mechanism 85 includes a drive pulley 86, which is driven by an electric motor 87 through a gear reduction drive 88. In the embodiment shown, four electric motors and gear reduction drive units 88 are shown, each being mounted on the end plate 83. It will be seen that the drive pulley for each conveyor mechanism is splined to the output shaft 89 of the associated electric motor gear reduction drive mechanism whereby, when each electric motor is energized, the drive pulley 86 will be rotated.

Each conveyor mechanism 85 also includes an idler pulley 90, which is positioned adjacent, but spaced from the discharge opening 70 in the frame member 18 of the indexing device. Each drive pulley and each idler pulley has an endless conveyor belt 91 trained thereabout and the endless conveyor belt of each conveyor mechanism 85 is adapted to engage a surface portion of the sausage stick S to retain the sausage stick S in a predetermined horizontal relation, while conveying the latter in a longitudinal direction.

All of the idler pulleys are mounted on an idler pulley support structure 92, which is rigidly affixed to the longitudinal frame members 84 of the positioning conveyor frame 82 adjacent the discharge opening 70 for the index device. It will be noted that the idler pulley support structure 92 has the configuration of a cross and defines a cross-shaped opening 93 therethrough. The idler pulleys are positioned in the cross-shaped opening 93 of the idler pulley support structure 92 so that two of the pulleys are horizontally disposed and two of the pulleys are vertically disposed.

The idler pulley support structure 92 has four substantially identical connector links 94 pivotally secured thereto for pivotal movement relative thereto. Each connector link has a pair of spaced apart elongate frame elements 95 secured thereto and extending longitudinally therefrom. Each pair of frame elements 95 has a plurality of longitudinally spaced apart idler rollers 96 journaled thereon. The idler rollers 96 for each conveyor mechanism 85 are engaged by the associated endless conveyor element 91. In this regard, it will be noted that the idler rollers 96 have a diameter substantially less than the diameters of the drive and idler pulleys. However, that portion of the idler rollers 96 which is disposed in proximal relation with the sausage stick S will be engaged by the associated endless conveyor element 91. It will be noted that a plurality of yieldable band elements 97 extend around and engage the idler roller frame elements 95 of each conveyor mechanism 85 to hold the idler frame elements in yieldable predetermined relation. The idler frame elements may yield in response to variances in the sizes of the diameters of the sausage sticks as they are conveyed by the positioning conveyor. It will be appreciated that, when the electric motors 87 are energized, the conveyor mechanisms 85 will be driven in a direction to move the sausage sticks discharged from the indexing device longitudinally towards the plate 83. It will further be noted that the sausage sticks discharged from the indexing device by the sausage discharge mechanism will be gripped and engaged by the positioning conveyor 82 so that each sausage stick S is held in predetermined horizontal relation as it is conveyed by the positioning conveyor.

It will be noted that the end plate 83 of the positioning conveyor frame 82 has an opening 98 therein which is of a size to permit passage of sausage sticks S therethrough. With this arrangement, the sausage sticks are moved through the opening 98 where the casing of the sausage stick is gripped by a casing stripper assembly 99. The casing stripper assembly 99 includes a generally cylindrical elongated body 100 which is comprised of a cylindrical central portion 101, a cylindrical rear end portion 102, and a cylindrical front end portion 103. It will be noted that the front and rear end portions of the body 100 have a diameter substantially larger than the diameter of the central portion 101. It will also be noted that the central portion 101 of the body 100 has a plurality of elongate, longitudinal extending, circumferentially arranged slots 104 therein. The rear end portion 102 of the body 100 has a collar 105 rigidly affixed thereto and projecting radially outwardly therefrom. The collar 105 has a plurality of radially extending slots 106 therein. The front end portion 103 of the body 100 has a collar 107 affixed thereto and projecting outwardly therefrom.

The casing stripper assembly 99 also includes a plurality of identical pneumatic cylinder and piston units 108 mounted on the casing stripper body 100. Each cylinder and piston unit 108 includes an elongate cylinder 109 having a tab 110 affixed to the rear end thereof and each tab 110 has an opening therethrough for accommodating a pin 111. Pin 111 projects outwardly from the tab and engages in one of the slots 106 in the collar 105.

Each cylinder and piston unit also includes a piston rod 112 having a movable clamping member 113 affixed thereto for movement therewith. In the embodiment shown, the clamping member 113 has a threaded opening therethrough, which threadedly engages the threaded end portion of the piston rod 112. The clamping member 113 has a pair of wedge-shaped clamping elements integrally formed therewith and extending rearwardly therefrom. The cylinder 109 of each cylinder and piston unit has a stationary clamping member 115 affixed thereto adjacent the front end thereof. The stationary clamping member has a pair of opposed inclined clamping surfaces 116 which mate with the inner clamping surfaces of the wedge-shaped clamping elements 114.

Figure 6:
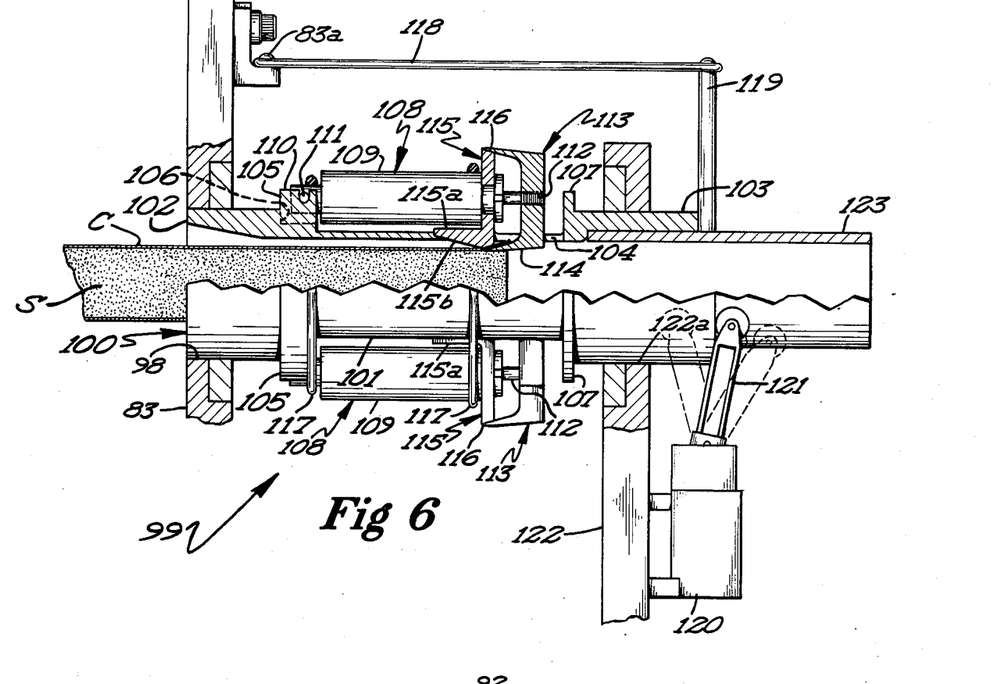
FIG. 6 is a sectional view of the casing stripper device taken approximately along the line 6—6 of FIG. 4 and looking in the direction of the arrows.

Referring now to FIG. 6, it will be seen that a plurality of resilient bands 117 extend around the cylinder and piston units to hold the units against the casing stripper body 100. It will also be seen that a resilient band 118 is positioned around a retaining element 119 on a sleeve 123 and is also positioned around a retaining element 83a on the end plate 83. The sleeve 123 and the body 100 projects through an opening 122a in a vertical frame member 122. A limit switch 120 is mounted on the vertical frame member 122. The switch 120 is provided with a switch arm 121, which is pivotally connected thereto and which is engaged by the front end portion 103 of the casing stripper body 100.

The switch arm 121 is spring urged towards a rearward direction, but will be shifted forwardly by the casing stripper 99 as the sausage sticks are urged through the casing stripper assembly. The switch arm 121 has a roller 121a secured to the the upper end thereof and is engaged by the front end portion 103 of the body 100. In this regard, it will be noted that each stationary clamping member 115 has a cam element 115a integrally formed therewith and projecting rearwardly therefrom. Each cam element has a forwardly declined camming surface 115b. These camming surfaces 115b collectively converge in a forward direction and, when engaged by the sausage stick, will shift the entire casing stripper assembly 99, including the sleeve 123, forwardly against the bias of the resilient band 118. When this occurs, the switching arm 121 will be shifted forwardly, which actuates the control valves (not shown) for the pneumatic piston and cylinder units 108. This retracts the piston rod 112 which shifts the clamping member 113 into mating relation with the stationary clamping member 115. It will be noted that the inner surface of each wedge-shaped clamping element 114 will cooperate with its associated clamping surface 116 to clamp the sausage stick casing therebetween. As the sausage stick S is moved forward, the casing C will be progressively stripped from the sausage stick.

As the sausage stick is moved through the opening 122a in the vertical frame member 122, the casing gripper assembly will retain the casing against movement, and each sausage stick will be gripped by one of a pair of substantially identical sausage grippr devices 124. Each sausage gripper device 124 includes a sausage gripper frame 125 including an elongate longitudinally extending frame member 126 which is rigidly affixed to one of the vertical frame members 12 at one end thereof and which is rigidly affixed to a vertical plate 127 at the other end thereof. The vertical plate 127 is also rigidly affixed to one of the vertical frame members 12, as best seen in FIG. 1. It will also be noted that the vertical plate 122 is rigidly secured to the longitudinal frame member 126.

Each sausage gripper device also includes an elongate tubular member 128 having an elongate longitudinally extending slot 129 in the lower portion thereof. The tubular members 128 are horizontally disposed and are positioned in side-by-side relation with respect to each other. Each tubular member 128 is rigidly secured to a rear pivot plate 130 by bolts 130a, and each tubular member is secured to a front pivot plate 131 by bolts 131a. A bearing assembly 132 is disposed between the front frame plate 127 and the rear pivot plate 130 to permit the pivot plate and tubular member to be rotated relative to the front frame plate. A bearing assembly 133 is disposed between each vertical frame member 122 and the front pivot plate 131 to permit rotation of the pivot plate and tubular member relative to the frame member 122. It is pointed out that the axis of rotation of each sausage gripper device 124 is the longitudinal axis of the tubular member 128.

Each sausage gripper device 124 includes a Festo linear drive cylinder assembly 134, which comprises a tubular pipe 135 positioned interiorly of the tubular member 128. The Festo pipe 135 is formed of non-magnetic material and is connected at its rear end by a coupling unit 136 to an elongate cylindrical stop member 137. The stop member 137 is mounted on a cylindrical mounting member 138 which has an enlarged end portion 139 secured to the pivot plate 130 by suitable bolts. An air pipe 140 projects through the bearing assembly 133, the pivot plate 130 and support member 138 and is connected in communicating relation with the Festo pipe 135. The air pipe 140 is connected to a source of air under pressure and supplies air to one end of the Festo pipe 135. An air pipe 141 extends through the bearing assembly 132 and the pivot plate 131 and is connected in communicating relation to the other end of the Festo pipe 135. The air pipe 141 is also connected to a supply of air under pressure and supplies air to the Festo linear drive cylinder assembly.

The Festo linear drive cylinder assembly 134 includes an outer magnetic yoke 142, which is positioned within the tubular member 128 and is positioned around the Festo cylinder barrel 135. A magnetic piston 144 is positioned within the Festo cylinder barrel 135 and suitable seals 145 are positioned in engaging relation with the magnetic piston 144 and also engage the inner surface of the Festo cylinder barrel to form an air seal thereat. With this arrangement, it will be seen that, when air under pressure is supplied to either end of the Festo cylinder, the magnetic piston 144 will be moved axially by the air pressure and the magnetic yoke 142 will move with the magnetic piston 144.

A pair of substantially identical connector members or frames 146 are each placed at each end of the magnetic yoke 142 for movement therewith. The ends of the magnetic yoke 142 do not snugly engage the connector members 146, which permits the magnetic yoke 142 to center itself within the frames or connector members. Each connector member 146 is connected by suitable bolts 148 to a frame 147 that is positioned below the Festo cylinder and which projects through the slot 129 and the tubular member 128. The frame 147 is secured by suitable bolts to a rigid sleeve 149 formed of suitable metal or the like, and the sleeve 149 has a sleeve-like air bladder 150 positioned therein. A fitting 151 is connected to the frame 147 and the fitting 151 communicates with an air passage 151a in the frame and sleeve 149 and to the bladder 150. A flexible air conduit 152 is connected to the fitting 151 and is also connected to a fitting 153 on the pivot plate 130. The fitting 153 is connected to another conduit which, in turn, is connected to a source of air under pressure. It will be seen that, when air is supplied through the flexible conduit 152, the air bladder 150 will be inflated so that the inner surface defined by the air bladder will be reduced. Conversely, when air is evacuated through the conduit 152, the bladder will be deflated. Since the sleeve 149 and associated bladder move with the Festo cylinder 142, the flexible air conduit 152 is coiled to permit extension and compression of the coils during this movement.

Each of the cylindrical connector members 146 has a circumferentially arranged recess therein and each accommodates an arcuate shaped slide element 154 therein. The slide elements 154 are formed of Teflon and, therefore, have a low coefficient of friction. Each of the slide elements engages the inner surface of the tubular member 128 and facilitates sliding movement of the Festo cylinder 142 during movement thereof relative to the Festo pipe 135.

The front pivot plate 131 of each sausage gripper device 124 has an elongate sausage engaging ejector member 155 secured thereto by suitable bolts 156. It is pointed out that the Festo cylinder 142 is movable between an advanced position and a retracted position. The Festo cylinder engages the stop member 137 when it is shifted to the retracted position and it will be seen that the ejector member 155 projects through the bladder and associated sleeve 149 when the Festo cylinder 142 is in the advanced position.

Figure 8:
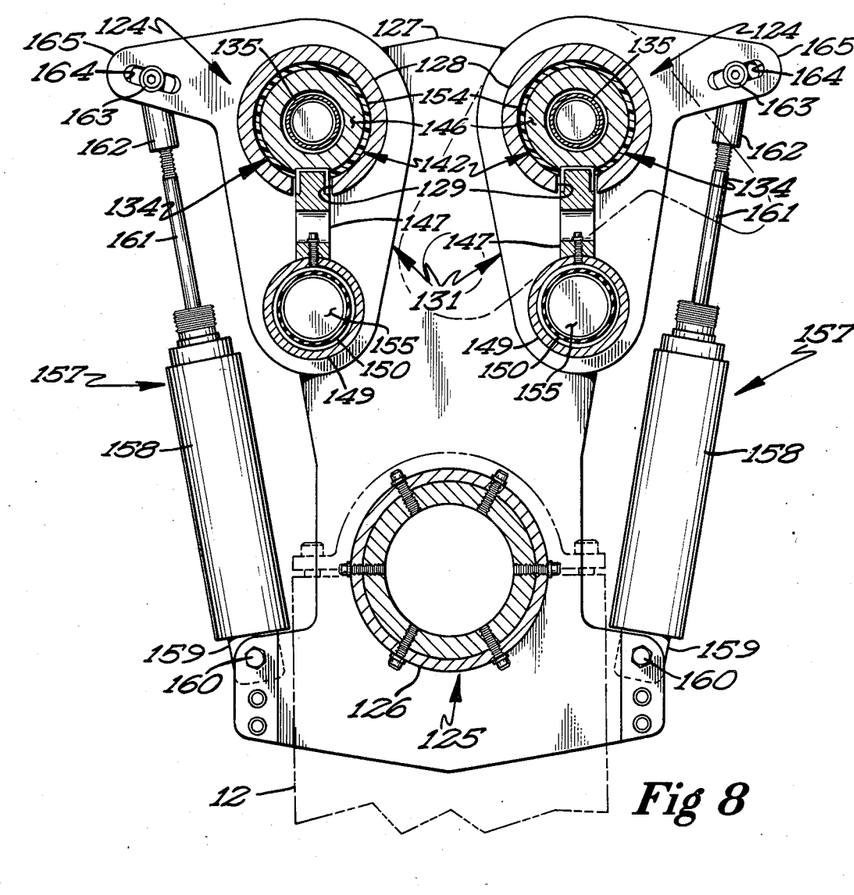
FIG. 8 is a cross-sectional view taken approximately along the line 8—8 of FIG. 1 and looking in the direction of the arrows.
Figure 9:
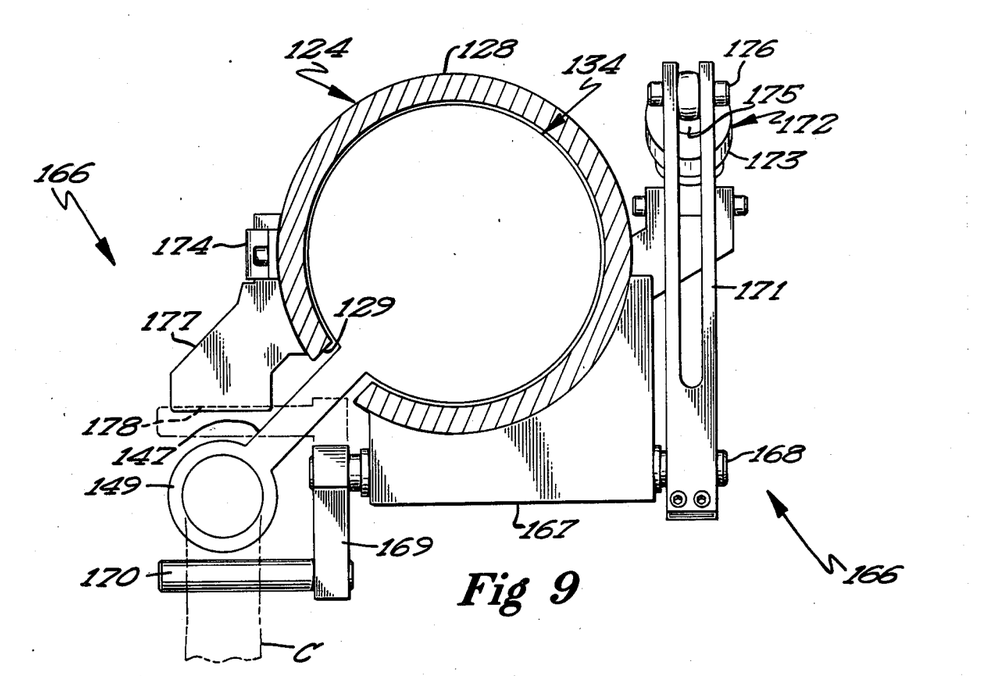
FIG. 9 is a sectional view taken approximately along the line 9—9 of FIG. 1, looking in the direction of the arrows, and illustrating details of construction of the casing clamping device.
Figure 10:
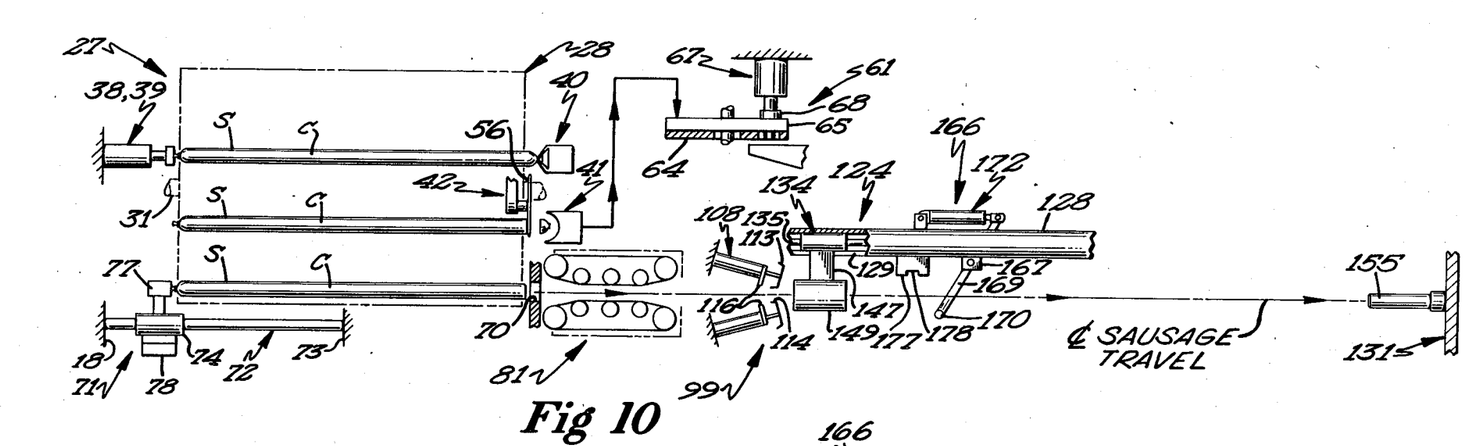
FIG. 10 is a diagrammatic view of the apparatus illustrating the portions of the various components thereof at the beginning of the stripping cycle.
Figure 11:
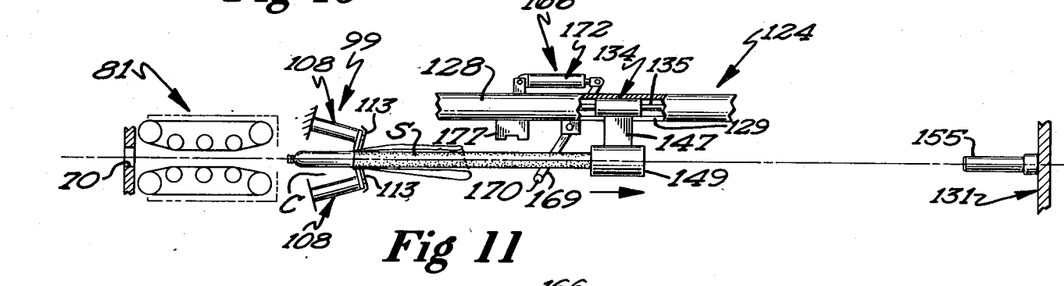
FIG. 11 is a diagrammatic view of the apparatus illustrating the sausage stick in a partially decased condition.
Figure 12:
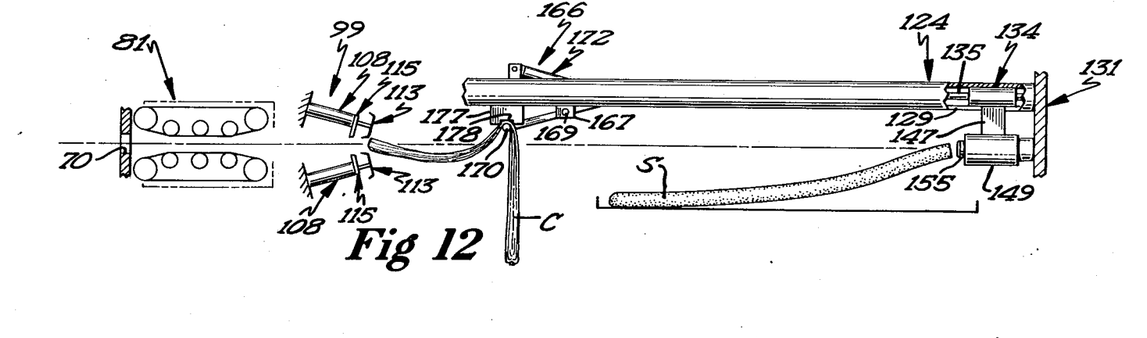
FIG. 12 is a diagrammatic view of the apparatus illustrating the sausage stick completely stripped of its casing and being ejected from the sausage gripper device.

It is pointed out that each sausage gripper device 124 is shiftable between an operative and inoperative position. When one sausage device is in the operative position, the other sausage device is in the inoperative position, as best seen in FIG. 8.

Means are provided for shifting each sausage gripper device between operative and inoperative positions and this means includes a pneumatic piston and cylinder unit 157 for each sausage gripper device. Each piston and cylinder unit includes a pneumatic cylinder 158 having a tab 159 affixed to one end thereof and pivotally connected by a pivot 160 to the frame plate 127. The cylinder 158 is provided with a piston (not shown) which is attached to a piston rod 161 having a coupling member 162 at its outer end. The coupling member 162 is connected by a nut and bolt unit 163 to a slot 164 and an arm 165 on the pivot plate 131.

It will be seen that extension and retraction of the piston rod 161 causes the pivot plate 131 and tubular member 128 to pivot about an axis defined by the longitudinal axis of the tubular member 128. This pivotal movement swings the lower end portion of the pivot plate 131 in an arc between the operative position wherein the sleeve 149 and air bladder 150 are disposed in aligned relation with the opening 122a in the frame member 122. The piston and cylinder units 157 for the sausage gripper devices operate simultaneously and one gripper device is in the operative position while the other device is in the inoperative position. When a gripper device is in the inoperative position, it will be positioned laterally to one side of the opening 122a in the frame member 122.

One of the sausage gripper devices will be in the operative position and the Festo cylinder 142 will be in the retracted position as the sausage is moved through the opening 122 in the frame member 122a. The sausage will be moved into the deflated bladder 150 and the bladder will be inflated to thereby grip the end portion of the sausage. The Festo drive cylinder assembly will be actuated to shift the Festo cylinder to the advanced position so that the sausage will be pulled from the casing which is held by the casing stripper assembly. The casing will trail after the sausage as it is pulled by the sausage gripper device, and means are provided for clamping the casing so that, when the Festo cylinder reaches the advanced position, the casing will be completely pulled from the sausage. Each sausage gripper device is provided with a casing clamping device 166 which includes a bearing block 167 mounted on one of the tubular members 128. Each bearing block 167 has an opening therein for accommodating a crankshaft 168 therethrough. One end of the crankshaft 168 is provided with an arm which is movable with the crankshaft. The other end of the elongate arm 169 has a clamping element 170 affixed thereto.

The other end of the crankshaft 168 for each casing clamping device 166 has a bifurcated yoke element 171 secured thereto for movement therewith. Means are provided for shifting the yoke element to produce rotation of the crankshaft and this means includes a piston and cylinder unit 172. Each piston and cylinder unit 172 includes a pneumatic cylinder 173 which is connected by an attachment member 174 mounted on the associated tubular member 128. The piston rod 175 of each piston and cylinder unit is connected to the yoke element 171 by a pivot pin 176. A clamping block 177 is also secured to the associated tubular member 128 and each clamping block has a slot 178 therein.

Each clamping device is shifted between clamping and release positions by the piston and cylinder unit 172. In this respect, when the piston rod 175 of each piston and cylinder unit is extended, the crankshaft 168 will be rotated to shift the arm and clamping element 170 so that the latter engages in the slot 178 of the clamping block 177. This will clamp the casing against the clamping block so that, when the Festo cylinder of the sausage gripper mechanism reaches its advanced position, the clamped casing will be completely stripped from the sausage. The end portion of the sausage will be engaged by the ejector member, thereby releasing the sausage from the sausage gripper mechanism. It is pointed out that the bladder will be deflated just before sausage hits ejector member 155. The released sausage will fall upon a conveyor 180 where the sausages will be conveyed to a collection point.

In operation, sausage sticks which are to have their casings removed therefrom will be placed on the infeed conveyor 29 so that the sausage sticks are disposed in side-by-side relation. In this regard, the sausage sticks may be fed manually or may be supplied thereto by separate feed mechanisms. The infeed conveyor 19 conveys the sausage sticks in sequential fashion to the indexing device 27. Each sausage stick will be positioned in one of the arcuate recesses 29 of the indexing drum 28 and the latter will be moved in index increments of movement by the indexing drive mechanism 33.

Each sausage stick will be moved to a position where it will be aligned with a pneumatic cylinder and piston unit 39 which will be actuated to shift the sausage stick towards the declipper unit 40. The declipper unit 40 will be in the open condition and will be actuated to cut the end portion of the casing containing the clip from the remaining portion of the casing. The indexing drum will be indexed to the next station where the pneumatic cylinder and piston unit 38 will shift the sausage stick to the gripper unit, which will be disposed in open condition. The actuating switch arm for the gripper unit will be engaged by the end of the sausage, which will actuate the gripper unit so that the latter is closed into gripping relation with respect to the end portion of the sausage. The cutting assembly will be actuated to energize the motor 46 to thereby drive the rotary blade 56. The piston rod 59 of the cylinder 57 will be extended to shift the rotary blade so that the latter cuts the end portion of the sausage stick and the cut portion will be retained by the gripper unit.

After the end portion of each sausage stick has been cut from the sausage, the indexing drum will index the sausage so that it is aligned with the sausage discharge mechanism 71. Air under pressure will be supplied to the Festo linear drive cylinder 72 to shift the magnetic slug or piston 75 axially thereof. This movement of the magnetic piston 75 also produces corresponding movement of the magnetic sleeve 74, which has the arcuate sausage engaging member 77 secured thereto. The sausage will be shifted longitudinally of its associated arcuate recess until the magnetic sleeve 74 engages the stop member 73. Before this occurs, the end portion of the sausage will be moved through the discharge opening 70 in the frame member 18 and will be gripped by the positioning conveyor 81.

The conveyor mechanisms 85 of the positioning conveyor will convey each sausage in horizontal fashion, front end first, through the opening 98 in the end plate 83. Each sausage will be conveyed through the rear end portion of the casing stripper assembly 99 and will engage the camming surface 115b of each stationary clamping member 115. When this occurs, the entire casing stripper assembly will be shifted forwardly against the bias of resilient element 118 to shift the switch arm 121 and actuate the limit switch 120. This causes the piston rods 112 of the pneumatic cylinder and piston units 108 to retract so that the wedge-shaped clamping elements 114 coact with the stationary clamping members 115 to grip the end portion of the casing as the sausage is being moved. The sausage will be moved by the positioning conveyor 81 towards one of the sausage gripper devices 124 which will be diposed in axial alignment with the opening 98.

In this regard, one of the sausage gripper devices will be in the retracted position with the sleeve-like air bladder 150 in the deflated condition. The uncased end portion of the sausage will pass into the sleeve-like air bladder 150 and the latter will be actuated so that air under pressure will be supplied to the bladder to inflate the same and thereby grip the end portion of the sausage. The Festo air cylinder 142 will be actuated so that air under pressure is supplied to the Festo pipe 135 to shift the magnetic piston 144. This produces corresponding movement of the Festo cylinder 142 which shifts the sleeve and air bladder towards the downstream end of the apparatus. This movement will continue until the sleeve 149 and bladder 150 pass over the ejector member 155 which ejects the end portion of the sausage from the sausage gripper device. The bladder 150 must deflate just prior to passing over ejector member 155.

Prior to the sausage gripper device 124 reaching the ejector member 155, the casing clamping device 166 will be actuated so that the piston rod 175 of the piston and cylinder unit 172 will be extended to shift the clamping element 170 into clamping engagement in the slot 178 of the clamping block 177. This clamps the trailing end portion of the casing as the casing is completely pulled from the rear end portion of the sausage stick by the gripper device 124. The casing will be stripped from the rear end portion of the sausage and the sausage will be discharged upon a conveyor device where the sausages will be transferred for slicing. The casing clamping device 166 will then be actuated to shift the clamping element 170 away from the clamping block 177 to thereby release the casing into a container B. After the sausage stick has passed beyond the casing stripper assembly 99, the resilient band 118 will return the casing stripper assembly rearwardly to thereby actuate the pneumatic cylinder and piston units 108 so that the piston rods 112 are again extended. This releases the front end portion of the casing from clamped relation between the clamping members 113 and the stationary clamping members 115. It is pointed out that this occurs prior to the actuation of the casing clamping device 166.

The sausage gripper device which has just released the sausage will be in the completely advanced position and, as soon as the sausage is ejected from clamped relation with the sausage gripper device by the ejector member 155, the piston and cylinder unit 157 will be actuated to shift that gripper device which has been in the operative position to the inoperative position. Simultaneously, the piston and cylinder unit 157 for the other sausage gripper device will be actuated to shift that sausage gripper device to the operative position. This assures continuous operation of the casing stripping system without requiring an interruption for the return of the sausage gripper sleeve 149.

It will, therefore, be seen that casings can be continuously removed from sausage sticks in a high production operation. The present apparatus and method is, therefore, adapted for meat packing operations where high production is required. Once the sausage sticks have been supplied to the casing stripper apparatus, the entire operation is automatic, thereby effecting a large saving in labor.

From the foregoing, it will be seen that I have provided a novel casing stripping apparatus, which is not only effective for removing casing from sausge sticks, but functions in a more efficient manner than any heretofore known comparable system.

What is claimed is:

1. An apparatus for removing the casing from elongate casing-enclosed sausage sticks, the front end of each casing-enclosed sausage stick having been cut, comprising:

an elongate positioning conveyor having a receiving end for receiving the casing-enclosed sausage sticks in sequential fashion, and having a discharge end, each casing-enclosed sausage stick being longitudinally conveyed, front end first, from the receiving end to the discharge end of said positioning conveyor, casing stripper means positioned adjacent the discharge end of said positioning conveyor and engaging the front end of the casing to restrain the front end of the casing as the sausage stick is moved from the discharge end of the positioning conveyor, shiftable sausage gripper means being shiftable between a retracted position adjacent said casing stripper means and an advanced position remote from said casing stripper means, means for shifting said sausage gripper means between retracted and advanced positions, said sausage gripper means, when in the retracted position, gripping the decased front end of the sausage stick and being operable to pull the sausage stick from the casing when the sausage gripper means is shifted towards the advanced position, and casing clamping means positioned adjacent said casing stripper means clamping the trailing end portion of the casing when the sausage gripper means is shifted towards the advanced position whereby the sausage stick will be completely pulled from the clamped casing by said sausage gripper means.

2. The apparatus as defined in claim 1 and an indexing device positioned adjacent said elongate positioning conveyor and including a shiftable sausage supporting structure supporting a plurality of sausage sticks in horizontal relation thereon, drive means connected with said sausage supporting structure for shifting the latter in indexed fashion from a product receiving position to a product discharge position, a shiftable sausage discharge mechanism positioned adjacent said sausage supporting structure and being operable to engage and move each sausage stick into engaging relation with said positioning conveyor when each sausage is in the product discharge position.

3. The apparatus as defined in claim 2 wherein said sausage support structure of said indexing device comprises a generally cylindrically shaped indexing drum having a plurality of elongate recesses extending longitudinally thereof throughout the exterior surface thereof, each recess accommodating and supporting a sausage stick therein.

4. The apparatus as defined in claim 3 and a cutting mechanism mounted adjacent said indexing drum and being shiftable between operative and inoperative positions, said indexing drum moving each sausage stick to a cutting position located between the product receiving position and the discharge position, said cutting mechanism being operable to sever the front end of an encased sausage stick when shifted to the operative position.

5. The apparatus as defined in claim 3 and an infeed conveyor conveying each sausage stick to the indexing drum wherein each sausage is positioned in a recess on the drum at the product receiving position.

6. The apparatus as defined in claim 1 wherein said positioning conveyor includes a plurality of similar horizontally disposed elongate conveyor mechanisms arranged in opposed pairs, each sausage stick having its exterior surface engaged and supported by said conveyor mechanisms.

7. The apparatus as defined in claim 6 wherein each conveyor mechanism includes a drive pulley and an idler pulley spaced longitudinally from the drive pulley, an endless conveyor element trained about said drive and idler pulleys and engaging each sausage stick moved by said positioning conveyor.

8. The apparatus as defined in claim 6 and yieldable means engaging said conveyor mechanisms yieldably urging the same towards each other.

9. The apparatus as defined in claim 1 wherein said casing stripper means includes a hollow body through which each sausage stick is moved, a plurality of fixed clamping elements positioned adjacent said body and arranged in encircling relation with respect to a sausage stick moving through said body, a plurality of movable clamping elements positioned adjacent said fixed clamping elements, means for shifting each movable clamping element between clamping and release positions with respect to said fixed clamping elements, said movable clamping elements cooperating with said fixed clamping elements when shifted to the clamped position to clamp the front end of the casing against movement while the sausage stick is moved by said positioning conveyor.

10. The apparatus as defined in claim 9 wherein said body of said casing stripper means is of substantially cylindrical configuration and is provided with a plurality of openings therein arranged substantially throughout the periphery thereof, one of said fixed clamping elements and one of said movable clamping elements projecting into one of said openings in said body.

11. A continuous method of mechanically removing the casings from elongate casing-enclosed sausage sticks comprising:

sequentially moving the sausage sticks through a predetermined path of travel, each sausage stick being horizontally disposed during said travel and each sausage stick having a front and rear end, interrupting the travel of the sausage sticks and severing the front end of each sausage stick with a cutting medium, continuing said travel of the sausage sticks in which each sausage stick is moved, front end first, while maintained in a horizontal position, mechanically engaging the front edge portions of the casing of each sausage stick with a casing stripping medium during said travel to restrain the front end of the casing as the sausage stick is moved in said path of travel to thereby peel the casing from the front end of the sausage stick, mechanically gripping the decased front end of the sausage stick with a movable gripping medium and moving the gripping medium and sausage stick in said predetermined path of travel while the casing is restrained by the casing stripping medium to thereby completely peel the casing from the sausage stick, and mechanically ejecting the decased sausage from the gripping medium.

12. The method as defined in claim 11 and clamping the trailing end of the casing as it is stripped from the sausage prior to ejection of the sausage from the gripping medium.

13. The method as defined in claim 11 wherein each sausage stick during movement thereof in said predetermined path of travel is first moved through an arcuate path and thereafter through a rectilinear path of travel.

14. The method as defined in claim 11 wherein during movement of the sausage sticks in said predetermined path of travel, the exterior surface of each sausage is engaged and gripped by a conveying medium as the casing of each sausage stick is engaged by the casing stripping medium.

* * * * *